(12) United States Patent
Kaiser

(10) Patent No.: US 12,172,394 B2
(45) Date of Patent: Dec. 24, 2024

(54) RTM (RESIN TRANSFER MOLDING)—METHOD WITH INTERMEDIATE FIBROUS LAYER

(71) Applicant: BENTELER SGL GmbH & Co. KG, Paderborn (DE)

(72) Inventor: Dominik Kaiser, Ried im Innkrels (AT)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 333 days.

(21) Appl. No.: 14/966,338

(22) Filed: Dec. 11, 2015

(65) Prior Publication Data

US 2016/0167265 A1 Jun. 16, 2016

(30) Foreign Application Priority Data

Dec. 15, 2014 (DE) .......................... 102014118670.2

(51) Int. Cl.
*B29C 70/48* (2006.01)
*B29C 70/54* (2006.01)
*B29L 31/00* (2006.01)

(52) U.S. Cl.
CPC ............ *B29C 70/48* (2013.01); *B29C 70/547* (2013.01); *B29L 2031/774* (2013.01)

(58) Field of Classification Search
CPC ..... B29C 70/44; B29C 70/443; B29C 70/467; B29C 70/48; B29C 70/547; B29C 45/02; B29C 45/021
See application file for complete search history.

(56) References Cited

U.S. PATENT DOCUMENTS

| | | | |
|---|---|---|---|
| 3,309,450 A | 3/1967 | Rodgers | |
| 6,656,405 B1* | 12/2003 | Debergh | B29C 70/20 264/261 |
| 7,867,468 B1* | 1/2011 | Haddon | B82Y 40/00 977/720 |
| 9,156,208 B2 | 10/2015 | Heim et al. | |
| 2004/0038016 A1* | 2/2004 | Morozumi | B29C 70/547 428/292.1 |

(Continued)

FOREIGN PATENT DOCUMENTS

| | | |
|---|---|---|
| CN | 103328178 | 9/2013 |
| DE | 1504759 | 10/1969 |

(Continued)

OTHER PUBLICATIONS

MidContinent Plastics, "Screenshot of Glossary-Terms used in the Plastics Industry", accessed Sep. 21, 2020. (Year: 2020).*

*Primary Examiner* — Philip Y Louie
*Assistant Examiner* — Sonny V Nguyen
(74) *Attorney, Agent, or Firm* — Jacobson Holman PLLC

(57) ABSTRACT

The present invention relates to a method for the production of a fiber composite part, with a fibrous blank (6) being inserted into a mold (1) and the mold (1) being closed, and a matrix being injected into the closed mold (1), which is characterized in that at least sectionally an intermediate fibrous layer (15) is arranged locally fixed between the outer shell surface (7) of the fibrous material blank (6) and the inner shell surface (5) of the mold (1), so that the flow rate of the resin is reduced due to the randomly arranged fibers (15).

10 Claims, 5 Drawing Sheets

(56) References Cited

U.S. PATENT DOCUMENTS

| | | | | |
|---|---|---|---|---|
| 2007/0233061 | A1* | 10/2007 | Lehmann | A61B 17/60 606/59 |
| 2008/0150186 | A1* | 6/2008 | Abrams | B29C 45/14811 156/182 |
| 2012/0027609 | A1* | 2/2012 | Ogde | B29C 70/86 416/226 |
| 2013/0056900 | A1* | 3/2013 | Muller | B29C 70/48 264/160 |
| 2013/0266750 | A1* | 10/2013 | Grove-Nielsen | B32B 37/1009 428/35.7 |
| 2013/0328236 | A1* | 12/2013 | Yamamoto | B29C 70/48 264/257 |
| 2014/0256850 | A1* | 9/2014 | Gerard | C08J 5/24 523/222 |
| 2016/0075102 | A1* | 3/2016 | Jessrang | B32B 5/26 428/115 |
| 2017/0129207 | A1* | 5/2017 | Hallander | B82Y 30/00 |
| 2017/0247115 | A1* | 8/2017 | Mandel | B29C 70/84 |

FOREIGN PATENT DOCUMENTS

| | | |
|---|---|---|
| DE | 6960744 | 11/2000 |
| DE | 102009060699 | 6/2011 |
| DE | 102011112141 | 3/2013 |
| DE | 102013012005 | 1/2015 |
| EP | 2679372 | 1/2014 |
| JP | 2005059524 | 3/2005 |
| WO | WO 2012115067 | 8/2012 |

* cited by examiner

RTM (RESIN TRANSFER MOLDING)—METHOD WITH INTERMEDIATE FIBROUS LAYER

BACKGROUND OF THE INVENTION

The present invention relates to a method for the production of a fiber composite part.

It is known from prior art to manufacture products from fiber composites. For this purpose, the fibrous material is mixed with a matrix comprising resin, so that the part sets upon curing of the matrix. The part is provided with its actual stability by the alignment of the fibers within the fiber composite. For this purpose, various production processes are known, for example lamination, in which respectively one layer of fibrous material in the form of a mat, a woven fabric, or also a non woven fabric is applied, onto which then resin is applied, and the next layer of fibrous material is placed thereupon.

However, resin injection methods (resin transfer molding) are also known from prior art. For this purpose, a mold, also called cavity, is provided with a mold cavity. A fibrous material blank is inserted here, and then the mold is closed. Apertures are provided in said mold, through which the matrix is injected. The injected matrix then flows through the fibrous material. Upon conclusion of the injection process, the fiber composite part is partially cured and removed from the mold.

Here, the following two problems arise. The matrix is injected locally at one or various points and spreads by way of flowing from this point in the direction of the cavity of the mold. Cavities and/or hollow spaces remain between the inner shell surface of the closed mold and the fibrous material blank, in which no fibrous material is present, but only the environmental air present at the time the fibrous material blank is inserted and thus the pressure given therein. When the RTM tool is provided with a vacuum, reduced pressure develops. When now resin is injected, said resin flows through the cavities considerably faster than through the clear spaces within the fibrous material blank, thus the space between the individual fiber strands of the fibrous material blank. Therefore an uneven distribution of the matrix occurs in the fiber composite part produced here, so that the precision of production of the components produced is variable.

A second disadvantage is seen here in that tool ventilation apertures are provided, through which excess pressure can be ventilated, developing by the injection of resin. The potentially faster flowing resin therefore reaches the ventilation aperture and covers and/or closes it so that the areas not yet filled with resin may show air enclosures. This also reduces the precision of production.

PRIOR ART

When resin flows, in the frontal area thereof a flowing resin front develops. The flowing of the resin front can be controlled by a locally adjustable temperature of the mold, for example, which is known from DE 10 2011 112 141 A1, for example. Here, the disadvantages are, on the one hand, the high tool and production costs, and on the other hand, the fact that by the influence of the temperature the resin already begins to set so that several resin injection sites may potentially be necessary, under certain circumstances.

A production process for fiber-reinforced resin blanks is known from DE 1 504 759 A, in which a synthetic resin in the liquid state is inserted into a mold for the purpose of impregnation. A spacer material is arranged between the reinforcing fibrous material and the inner shell surface.

SUMMARY OF THE INVENTION

The objective of the present invention is therefore, based on prior art, to provide a method by which it is possible to compensate the disadvantages arising from vacancies and air enclosures in a resin injection method for the production of a fiber composite part, with the method remaining cost-effective and easily implemented, though.

Advantageous variants of embodiments of the method according to the invention are described in the dependent claims.

The method according to the invention for the production of a fiber composite part provides to insert a fibrous material blank, also called a preform, into a mold and to close said mold. Subsequently, resin is injected into the closed mold so that the RTM method is executed. In order to overcome the above-described disadvantages the method according to the invention provides that at least sectionally, preferably entirely, an additional layer and/or sheet of fibers, hereinafter also called intermediate fibrous layer or randomly oriented fibers and/or layer of randomly oriented fibers, is arranged additionally in a locally fixed fashion between the outer shell surface of the fibrous material blank and the inner shell surface of the mold and/or the inner shell surface of the mold cavity, so that this way the flowing speed of the resin is reduced due to said intermediate fibrous layer.

With the method according to the invention, particularly by selecting the density and/or size and the targeted sectional use of the fibers in the intermediate fibrous layer it is possible to control the flowing speed of the resin. Based on the arrangement of the intermediate fibrous layer and/or the randomly oriented fibers between the fibrous material blank and the inner shell surface of the mold, here particularly the flowing speed of the resin is reduced so that a homogeneously flowing resin front develops both through the fibrous material blank itself as well as into the cavities. Furthermore, the pressure in the matrix itself increases so that the matrix material continues to show the trend for penetrating laterally into the fibrous material blank, perpendicular in reference to the direction of flow.

Within the scope of the invention resin shall be understood as a matrix resin and/or a resin system. Here, a one-component but also a multi-component resin may be given, with the resin then for example beginning to cure by thermal activation and/or the addition of a curing agent. In the following the terms resin and resin system are used interchangeably.

In particular, the randomly aligned fibers must be positioned in a locally fixed fashion so that they are not entrained by the pressure applied during the injection process and/or by the flowing resin front and then compact at undesired places.

According to the invention, this is attained in the options described in detail in the following. It is possible to apply randomly aligned fibers and/or aligned fibers via a flocking process, or it is possible to generate randomly aligned fibers by roughening the fibrous material blank itself.

In general, however, the intermediate fibrous layer is arranged in the above-described cavities or in an alternative variant of the embodiment in the cavities developing between the outer shell surface of the fibrous material blank and the inner shell surface of the closed mold. In particular, the arrangement occurs in areas in which only minor compression develops and/or is expected between the outer shell surface of the fibrous material blank and the mold cavity. This is particularly the case in the areas extending aligned parallel or at an acute angle in reference to the direction of the compression stroke of the mold. In the areas essentially arranged perpendicular to the direction of the compression stroke, based on the closing process, the option is given to apply sufficient compression force. Preferably, however, an intermediate fibrous layer and/or a layer of randomly oriented fibers is arranged surrounding the entire component.

However it is also possible by a targeted concentration of fibers in the intermediate fibrous layer once more to influence the permeability of the intermediate fibrous layer. This can be achieved for example by a sectionally increased density of the fibers and/or by thicker fibers and/or by longer fibers. If therefore one of the above-mentioned three options is increased, lower permeability develops, thus less permeability for the flowing resin. This way, in a targeted fashion, the flow rate of the resin can be adjusted in the (different) areas, particularly reduced. Preferably fibers are used showing a length from 0.1 mm to 75 mm.

Within the scope of the invention it is also possible that resin flow channels are formed in the mold. A cavity or bulging, extending away from the mold cavity opposite the inner shell surface of the mold cavity, is embodied so that here intentionally resin can flow faster to a predetermined location. Here it is also possible within the scope of the invention that the fibers are arranged in a targeted fashion in said resin flow channel.

Within the scope of the invention it is now possible to roughen the fibrous material blank at its surface. The fibrous material blank shows particularly different layers of fibrous material, which are embodied as a woven web or also as individual fiber strands with a direction of orientation. Now, for example, a motion is performed on the surface with a scraper or also with a knife-like tool, parallel in reference to the surface, so that individual filaments and/or individual fiber strands are separated from the fibrous bundles of the uppermost layer and then project from said surface. Therefore a layer of randomly aligned fibers develops, which in reference to the outer shell surface of the original fibrous material blank is embodied projecting in one piece or made from the same material. Due to the duration and/or the intensity of the roughening process the density of the developing layer of randomly aligned fibers can be influenced. When inserting the fibrous material blank into the mold and closing said mold here the randomly aligned fibers projecting therefore fill the empty spaces and/or cavities and this way prevent any excessively fast flowing of the resin into these spaces.

The projecting randomly aligned fibers are particularly generated by way of a roughening process and show a length from 0.1 mm to 75 mm, preferably 0.1 mm to 15 mm, projecting from the surface. Here it is advantageous that by intensity and/or pressure of the roughening process in a targeted fashion locally different densities can be adjusted of the layer of randomly aligned fibers and no additional material and/or adjuvants are required, because the generated layer of randomly aligned fibers is formed in one piece and of the same material at a fibrous material blank.

In a second preferred variant of the embodiment the fibers are applied by a flocking process. They may be applied without any particular alignment, thus as randomly aligned fibers and/or a layer of randomly aligned fibers, or aligned such that all fibrous sections are essentially aligned in a primary direction and thus an intermediate fibrous layer is formed, which is evenly aligned. For this purpose, an adhesive is applied on the fibrous material blank and/or the inner shell surface of the mold, thus onto the inner shell surface of the cavity of the mold. Abutting thereto, individual fiber sections are applied onto the area provided with an adhesive. Alternatively, the fiber sections may already be provided with adhesive and directly applied upon the previously untreated surfaces. The application process may occur particularly by way of air flow. Alternatively the part to be flocked with fibrous sections may be applied like affusion. Alternatively it is possible that fibrous sections are provided in an immersion bath and the component to be flocked is inserted into said bath.

Within the scope of the invention preferably fiber sections are used, showing a length from 0.1 mm to 75 mm, particularly from 1 mm to 20 mm, in particular from 1.5 mm to 3.0 mm, and particularly preferred at a length of 2 mm. Within the scope of the invention it is also possible to apply the fiber sections during the flocking process in an oriented fashion. This occurs particularly by applying with the help of an electrostatic field. Here, during the flocking process the fibrous sections are essentially aligned pointing away from the surface, particularly preferred orthogonally in reference to the surface. This way the advantageous effect is generated that during the closure of the mold cavity the fiber sections projecting from the surface are compressed and thus fill the developing cavity and/or empty space in a targeted and securely produced fashion. Thus the resin front flows lateral to the orientation of the randomly aligned fibers.

Within the scope of the invention, furthermore during the flocking process, here by way of masking, some surface areas can be flocked with increased density in a targeted fashion. Additionally, patterns, shapes, or contours can be applied. For example, appropriate stencils may be applied so that some areas are excluded while other areas are flocked in a targeted fashion. Within the scope of the invention it is also possible to apply adhesives onto areas in a targeted fashion and subsequently flocking the entire component, with fiber sections getting stuck only in some areas, while other areas show no fiber sections.

The flocking therefore shows sectionally an increased density and/or fibers with increased length and/or fibers with increased thickness in reference to other areas, in order to influence and/or adjust in a targeted fashion the flow rate developing for the resin.

Furthermore, it is particularly preferred for the mold to be heated, particularly showing temperatures sectionally different from each other. Heating occurs preferably at different times. This way, upon conclusion of the injection process in a targeted fashion the curing of the resin can be initiated and/or additionally the flow rate can be controlled by the temporary thermal influence.

Within the scope of the invention particularly motor vehicle parts are produced as fiber composite parts using this method. Particularly preferred, leaf springs for motor vehicle axles are produced with a method according to the invention.

The preform shows here particularly parts made from fiber composite, however it may also be sectionally mixed with resin or other adhesives. Within the scope of the invention, materials may be used with an appropriate layer of randomly aligned fibers being applied on its surface.

The method according to the invention is particularly suited for retrofitting existing production processes, because, for example when applying flocking onto the fibrous material blank, no additional tools or other processing parameters are required regarding the actual resin injection process.

Overall, the processing safety is considerably increased for resin injection methods and expensive processing steps can be waived, such as the targeted adjustment of the local temperature for controlling the flow rate of the resin. Additionally, any change of the pressure control for the resin injection process is not required to influence a targeted flow rate of the resin front.

Furthermore, within the scope of the invention the layer of randomly aligned fibers can be waived at areas at which a grasper, particularly a frozen gripper, engages in order to remove the part from the mold and/or initially insert it into the mold, so that also the fibrous material blank and/or the fiber composite part produced can be grasped in a secure process.

DESCRIPTION OF THE DRAWINGS

Additional advantages, features, characteristics, and aspects of the present invention are the object of the following description. Preferred variants of the embodiment are shown schematically in the figures. They serve for the simple understanding of the invention. It shows.

In the figures, identical or similar components are marked with the same reference characters, even if a repeated description is waived for reasons of simplification.

DETAILED DESCRIPTION OF THE INVENTION

Figure 1:
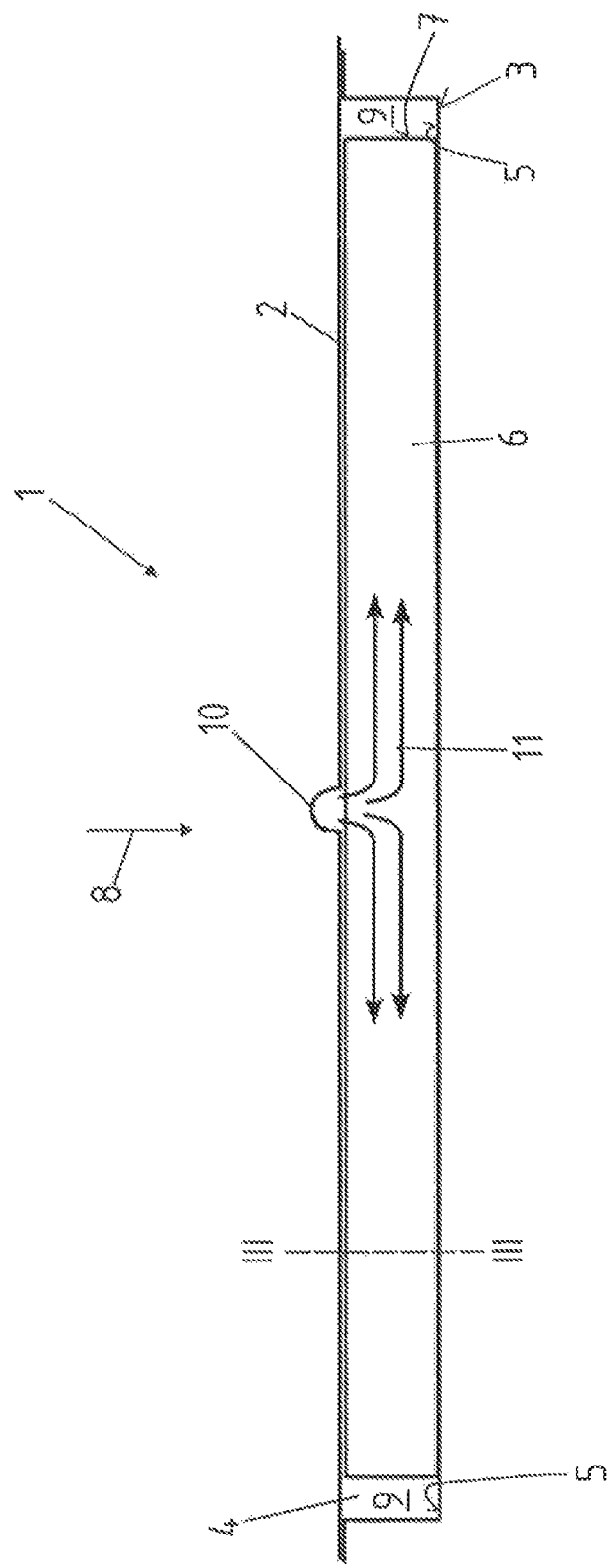
FIG. 1 a compression tool with an inserted fibrous material blank without a layer of randomly aligned fibers in the side view.
Figure 2:
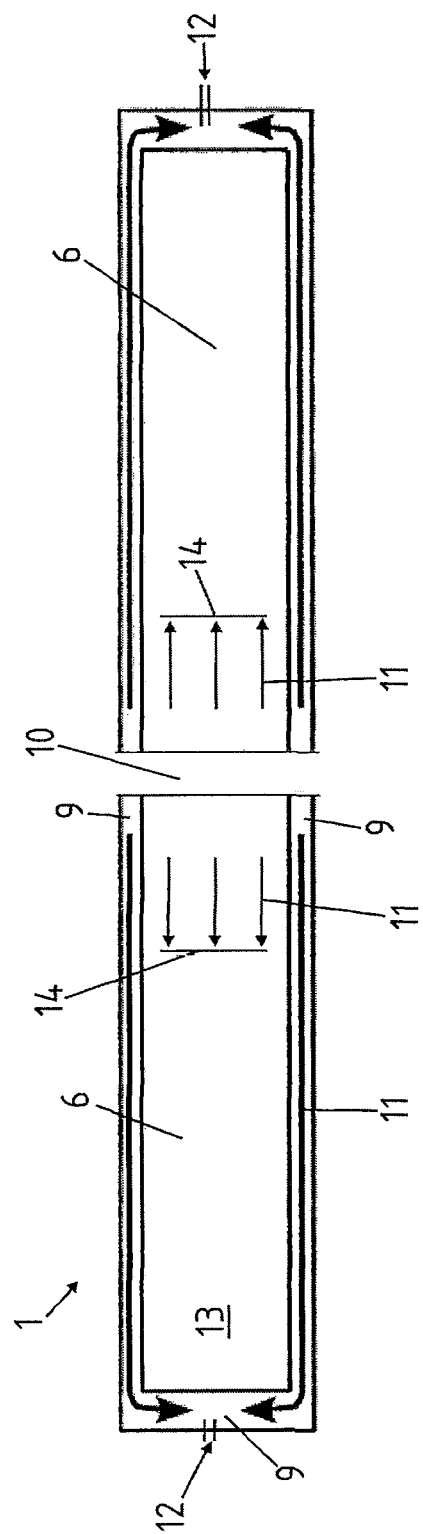
FIG. 2 the compression tool of FIG. 1 in a top view.

FIG. 1 shows a schematic mold 1, comprising an upper tool 2 and a lower tool 3, which is closed and thus shows a mold cavity 4. An inner shell surface 5 is formed in the mold cavity 4. Further, a fibrous material blank 6 is inserted in the mold cavity 4, with the outer shell surface 7 of the fibrous material blank 6, particularly in the areas essentially aligned perpendicular in reference to the direction of the compression stroke 8, coming into contact with the inner shell surface 5 of the mold cavity 4. However, empty spaces 9 remain, in which the outer shell surface 7 of the fibrous material blank 6 fails to contact the inner shell surface 5 of the mold cavity 4. In a central area a resin injection aperture is provided in the form of belt gating 10, so that injected resin flows through it into the fibrous material blank 6. In the top view according to FIG. 2 it is clearly discernible that not only like in FIG. 1 the empty spaces 9 remain at the left and the right, but they are given circumferentially at all sides. Consequently particularly the resin flow 11 through the empty spaces 9 progresses considerably faster than the developing resin flow 11 through the fibrous material blank 6. Further, ventilation apertures 12 are provided at the ends, which are closed by the resin flow 11 rushing ahead through the empty spaces 9, so that potential air enclosures located in front of the resin front 14 of the resin flowing through the fibrous material blank 6 are enclosed in the fiber composite part to be produced.

Figure 3:
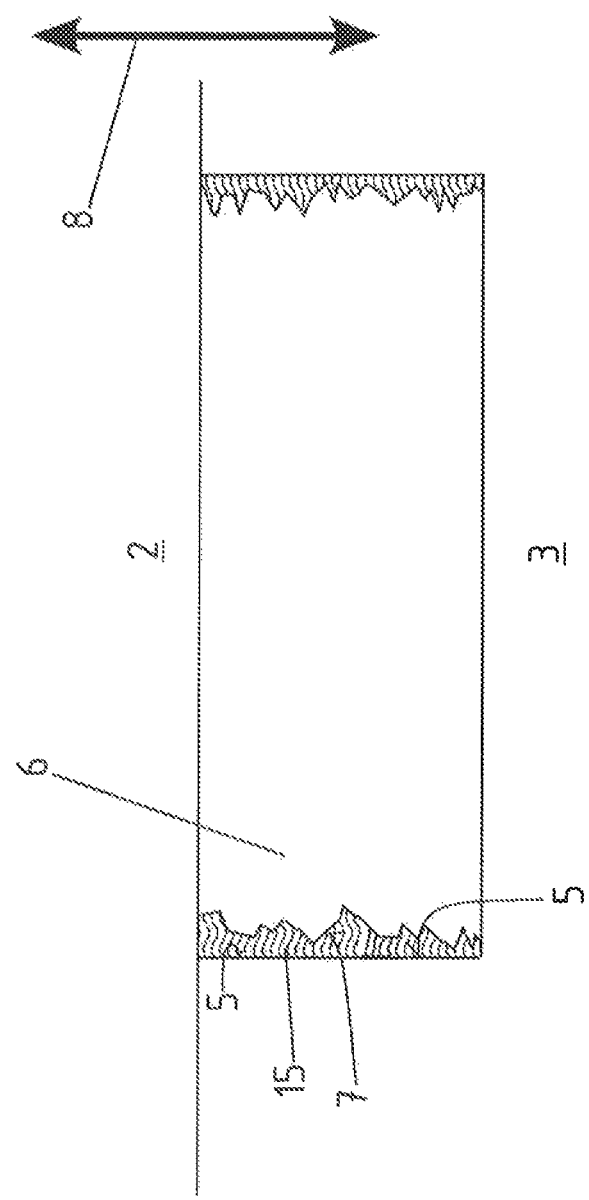
FIG. 3 a cross-section according to the section line III-III in FIG. 1.
Figure 4:
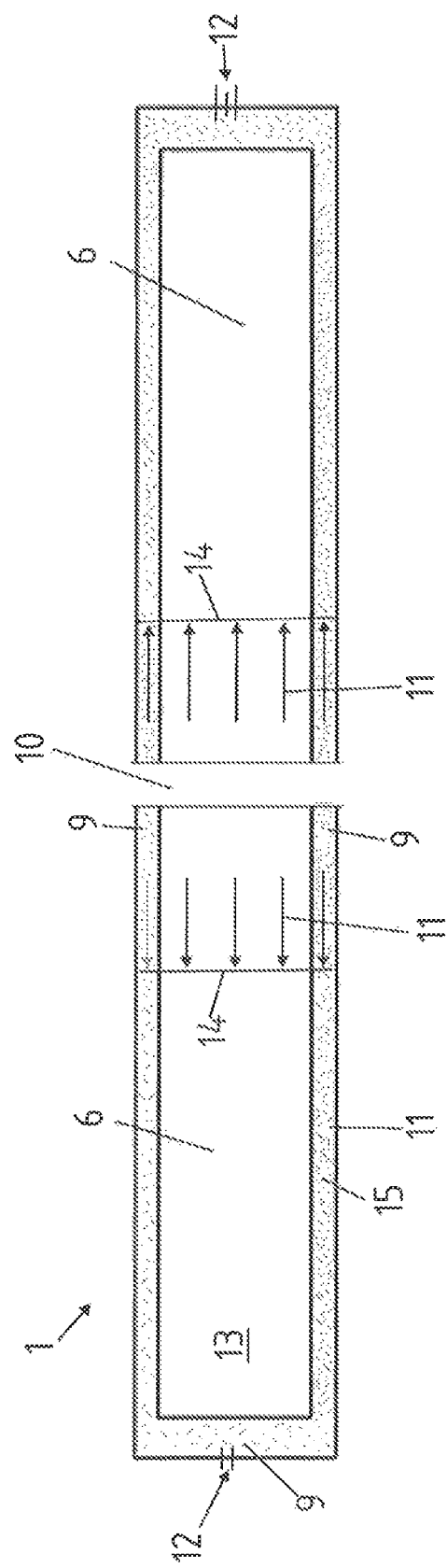
FIG. 4 a view of FIG. 2 with a layer of randomly aligned fibers according to the invention.

This is the start of the method according to the invention, shown in FIG. 3. An intermediate fibrous layer 15 is arranged between the outer shell surface 7 of the fibrous material blank 6 as well as the inner shell surface 5 of the mold cavity. Here, the intermediate fibrous layer 15 is shown as a layer of randomly arranged fibers. Based on this layer of randomly arranged fibers in the cavities, which extend particularly parallel in reference to the direction 8 of the compression stroke, any otherwise existing resin flow 11, shown in FIG. 2 and rushing ahead to the cavities 9, is prevented and a particularly homogeneous resin front 14 is achieved, shown in FIG. 4.

Figure 5:
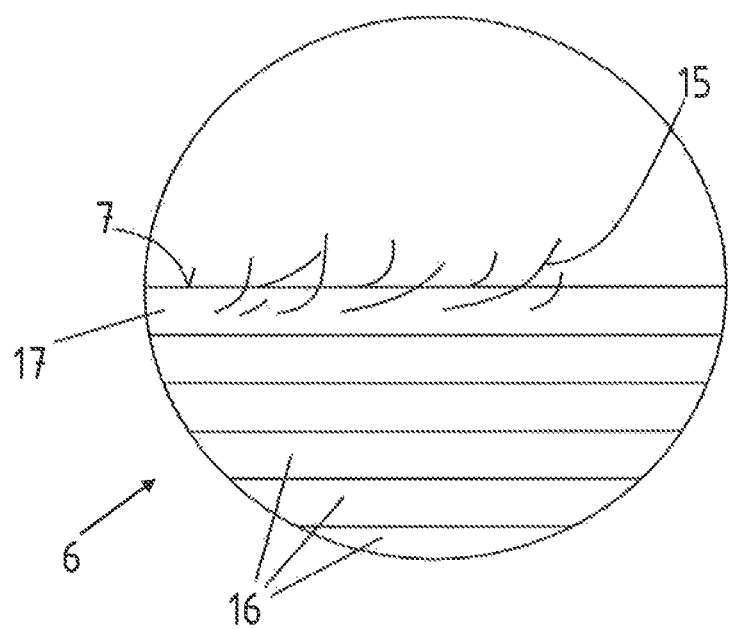
FIG. 5 a layer of randomly aligned fibers produced by roughening.

FIG. 5 shows a detail of a fibrous material blank 6, with the fibrous material blank 6 being formed from several layers 16, shown here as fibrous material mats. Opposite the outer shell surface 7 of the fibrous material blank 6 an intermediate fibrous layer 15 projects with individual, randomly aligned fibers, with the randomly aligned fibers being formed by filaments or fiber strands by way of roughening, particularly scraping the uppermost layer 17 forming the outer shell surface 7 of the fibrous material blank 6.

Figure 6:
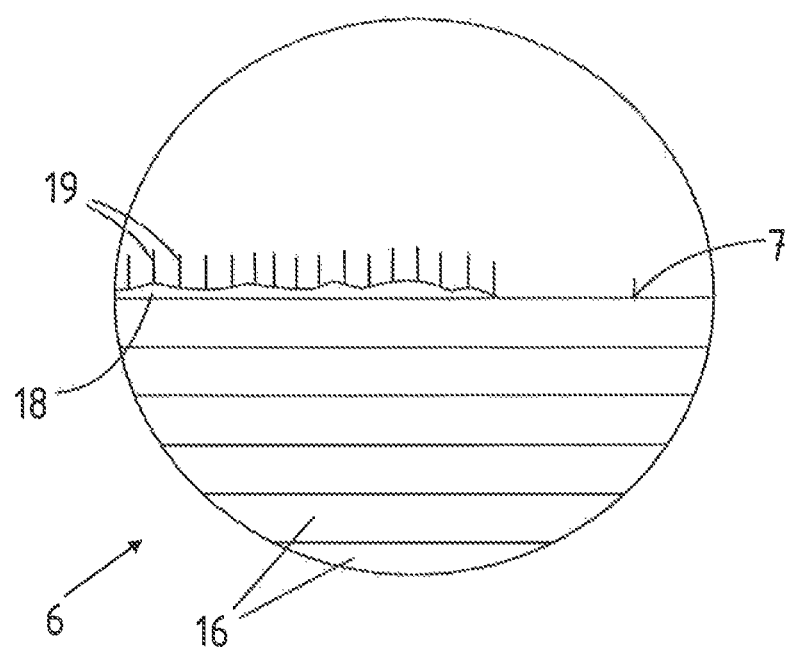
FIG. 6 an intermediate fibrous layer produced by a flocking process.

For this purpose, FIG. 6 shows a fibrous material blank 6 comprising several layers 16, with an adhesive layer 18 being applied onto the outer shell surface 7 and individual fiber sections 19 are flocked onto the adhesive layer 18. The fiber sections 19 are essentially aligned perpendicular in reference to the outer shell surface 7, which is achieved for example by an electrostatic field. It is further shown that the adhesive layer 18 is applied only sectionally, so that the fiber sections 19 are applied by the flocking process only at some areas onto the outer shell surface 7. However, a comprehensive application onto the entire outer shell surface 7 is also possible. Additionally, individual fiber sections 19 may be applied in a randomly aligned fashion so that the intermediate fibrous layer is flocked thereupon in the form of randomly aligned fibers.

LIST OF REFERENCE CHARACTERS

1—mold
2—upper tool
3—lower tool
4—mold cavity
5—inner shell surface of 4
6—fibrous material blank
7—outer shell surface 6
8—direction of compression stroke
9—cavity
10—band gating
11—resin flow
12—ventilation aperture
13—air enclosure
14—resin front
15—intermediate fibrous layer
16—layer
17—uppermost layer
18—adhesive layer
19—fiber sections

The invention claimed is:

1. A resin transfer molding (RTM) method for the production of a fiber composite part comprising,
inserting a fiber preform blank with an outer shell surface into a closed mold with an inner shell surface,
arranging an intermediate fibrous layer in channels for resin flow and located between the outer shell surface of the fiber preform and the inner shell surface of the closed mold, wherein the intermediate fibrous layer generated by roughening the outer shell surface of the fiber preform blank by a scraper, or by way of a flocking process, thereby generating individual filaments and/or fiber strands projecting and pointing away from the outer shell surface of the fiber preform blank to cause a reduction in the flow rate of a resin system through the intermediate fibrous layer between the outer shell surface of the fiber preform blank and the inner shell surface of the mold, injecting the resin system into the closed mold, and developing a homogenous resin front through the fiber preform blank and the intermediate fibrous layer arranged in the channels.

2. The method according to claim 1 wherein, the intermediate fibrous layer is arranged in cavities between the outer shell surface of the fiber preform blank and the inner shell surface of the closed mold.

3. The method according to claim 1 wherein, the intermediate fibrous layer is arranged in cavities aligned at an angle from 0 degree to 90 degrees with reference to a direction of a compression stroke of the mold.

4. The method according to claim 3 wherein, the cavities extend at an angle from 0 degree to 80 degrees with reference to a direction of the compression stroke of the mold.

5. The method according to claim 1 wherein, the closed mold comprises a mold cavity, with a resin injection aperture located in a central section of the mold cavity and ventilation apertures provided at ends of the mold cavity, through which excess pressure, which has developed due to the resin injection, is released.

6. The method according to claim 1 wherein, in areas with less surface pressure between the mold and the fiber preform blank, when the mold is closed, a higher density of randomly aligned fibers and/or longer randomly aligned fibers is provided than in areas with higher surface pressure.

7. The method according to claim 1, wherein the generated individual filaments and/or fiber strands have a length from 0.1 mm to 75 mm.

8. The method according to claim 7 wherein, filaments and/or fiber strands are generated at a length from 1 mm to 20 mm.

9. The method according to claim 1 including heating the mold, or sectionally heating the mold to different temperatures and/or sections of the mold are heated at different points in time.

10. The method according to claim 1 wherein, a leaf spring is produced for a motor vehicle.

* * * * *